(12) United States Patent
Krasutsky (10) Patent No.: US 7,336,345 B2
(45) Date of Patent: Feb. 26, 2008

(54) LADAR SYSTEM WITH SAL FOLLOWER

(75) Inventor: Nicholas Krasutsky, Carrollton, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/178,100

(22) Filed: Jul. 8, 2005

(65) Prior Publication Data

US 2007/0008514 A1    Jan. 11, 2007

(51) Int. Cl.
*G01C 3/08* (2006.01)
(52) U.S. Cl. .................. 356/4.01; 356/4.1; 356/5.01
(58) Field of Classification Search ............. 356/4.01
See application file for complete search history.

(56) References Cited

U.S. PATENT DOCUMENTS

| | | | |
|---|---|---|---|
| 5,200,606 A | 4/1993 | Krasutsky et al. | 250/216 |
| 5,224,109 A | 6/1993 | Krasutsky et al. | 372/29 |
| 5,243,553 A | 9/1993 | Flockencier | 356/5 |
| 5,285,461 A * | 2/1994 | Krasutsky et al. | 250/234 |
| 6,115,113 A | 9/2000 | Flockencier | 356/5.01 |
| 6,184,828 B1 * | 2/2001 | Shoki | 342/372 |
| 6,262,800 B1 * | 7/2001 | Minor | 356/139.07 |
| 2002/0190162 A1 * | 12/2002 | McDonnell | 244/170 |
| 2006/0124838 A1 * | 6/2006 | Baker et al. | 250/221 |

\* cited by examiner

*Primary Examiner*—Thomas H. Tarcza
*Assistant Examiner*—Luke D. Ratcliffe
(74) *Attorney, Agent, or Firm*—Williams, Morgan & Amerson, P.C.

(57) ABSTRACT

A dual mode LADAR/SAL apparatus is disclosed. In one aspect, the apparatus includes a gimbal capable of scanning in azimuth and in elevation and a sensor mounted on the gimbal. The sensor includes a telescope, a LADAR optical path, and a SAL optical path. The telescope defines an exit pupil through which the sensor collects reflected light. The sensor further includes means for directing light received through the telescope to the LADAR optical path in a first position and to the SAL optical path in a second position such that the SAL optical path receives the collected light from the exit pupil of the telescope. The means may be, for example, a mirror. In a second aspect, an apparatus includes a gimbal capable of scanning in azimuth and in elevation, and a sensor mounted on the gimbal. The sensor includes a telescope defining an exit pupil through which the sensor collects reflected light. The sensor is capable of operating in a LADAR mode and in a SAL mode and receiving collected light in the SAL mode through a limited portion of the exit pupil.

45 Claims, 9 Drawing Sheets

… elided for brevity …

LADAR SYSTEM WITH SAL FOLLOWER

BACKGROUND OF THE INVENTION

1. Field of the Invention

The present invention pertains to a laser-based system and, more particularly, to a laser-based system with laser detection and ranging ("LADAR") and semi-active laser ("SAL") system capabilities.

2. Description of the Related Art

A need of great importance in military and some civilian remote sensing operations is the ability to quickly detect and identify objects, frequently referred to as "targets," in a "field of regard." A common problem in military operations, for example, is to detect and identify targets, such as tanks, vehicles, guns, and similar items, which have been camouflaged or which are operating at night or in foggy weather. It is important in many instances to be able to distinguish reliably between enemy and friendly forces. As the pace of battlefield operations increases, so does the need for quick and accurate identification of potential targets as friend or foe and as a target or not.

Remote sensing techniques for identifying targets have existed for many years. For instance, in World War II, the British developed and utilized radio detection and ranging ("RADAR") systems for identifying the incoming planes of the German Luftwaffe. RADAR uses radio waves to locate objects at great distances even in bad weather or in total darkness. Sound navigation and ranging ("SONAR") has found similar utility and application in environments where signals propagate through water, as opposed to the atmosphere. While RADAR and SONAR have proven quite effective in many areas, they are inherently limited by a number of factors. For instance, RADAR is limited because of its use of radio frequency signals and the size of the resultant antennas used to transmit and receive such signals. Sonar suffers similar types of limitations. Thus, alternative technologies have been developed and deployed.

One such alternative technology is laser detection and ranging ("LADAR"). Similar to RADAR systems, which transmit and receive radio waves to and reflected from objects, LADAR systems transmit laser beams and receive reflections from targets. Because of the short wavelengths associated with laser beam transmissions, LADAR data exhibits much greater resolution than RADAR data. Typically, a LADAR system creates a three-dimensional ("3-D") image in which each datum, or "pixel", comprises an (x,y) coordinate and associated range for the point of reflection.

Laser energy also finds application in these kinds of environments in what is known as a semi-active laser ("SAL") system. With the SAL system, a narrow laser beam is produced and transmitted toward a target. The laser radiation is typically generated and transmitted from a laser designator aircraft manned by a forward operator. The operator directs the laser radiation to a selected target, thereby designating the target. The laser radiation reflected from the target can then be detected by the laser seeker head of a missile or other weapon located remote from both the target and the laser energy transmitter. The SAL system includes processing equipment for generating guidance commands to the missile derived from the sensed laser radiation as it is reflected from the target. Such a system can be used by pilots or other users to identify a target and guide the missile or weapon to the target.

However, LADAR and SAL technologies typically are not deployed together. For one thing, the LADAR signal, its generation, and its transmission usually are not suitable for target designation, or "spotting." U.S. Pat. No. 6,262,800, entitled "Dual mode semi-active laser/laser radar seeker", issued Jul. 17, 2001, to Lockheed Martin Corporation as assignee of the inventor Lewis G. Minor documents one effort at combining the two technologies. In this patent, the LADAR transceiver is modified to be used as a SAL receiver as well as a LADAR receiver. However, the sensor disclosed and claimed therein still includes no on-board designator such that it must rely on a third party designator in the same manner as conventional SAL systems. Furthermore, this design alters the LADAR optical design and structure. It also has the warm telescope supports in its field of view ("FOV") and it requires precise positioning of the scan mirror when used in the SAL mode. Thus, there exists a need for a sensor which can function as a LADAR and also home on a designator.

The present invention is directed to resolving, or at least reducing, one or all of the problems mentioned above.

SUMMARY OF THE INVENTION

The invention, in its various aspects and embodiments, includes a dual mode LADAR/SAL apparatus. In one aspect, the apparatus comprises a gimbal capable of scanning in azimuth and in elevation and a sensor mounted on the gimbal. The sensor includes a telescope, a LADAR optical path, and a SAL optical path. The telescope defines an exit pupil through which the sensor collects reflected light. The sensor further includes means for directing light received through the telescope to the LADAR optical path in a first position and to the SAL optical path in a second position such that the SAL optical path receives the collected light from the exit pupil of the telescope. The means may be, for example, a mirror. In a second aspect, an apparatus comprises a gimbal capable of scanning in azimuth and in elevation, and a sensor mounted on the gimbal. The sensor includes a telescope defining an exit pupil through which the sensor collects reflected light. The sensor is capable of operating in a LADAR mode and in a SAL mode and receiving collected light in the SAL mode through a limited portion of the exit pupil.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
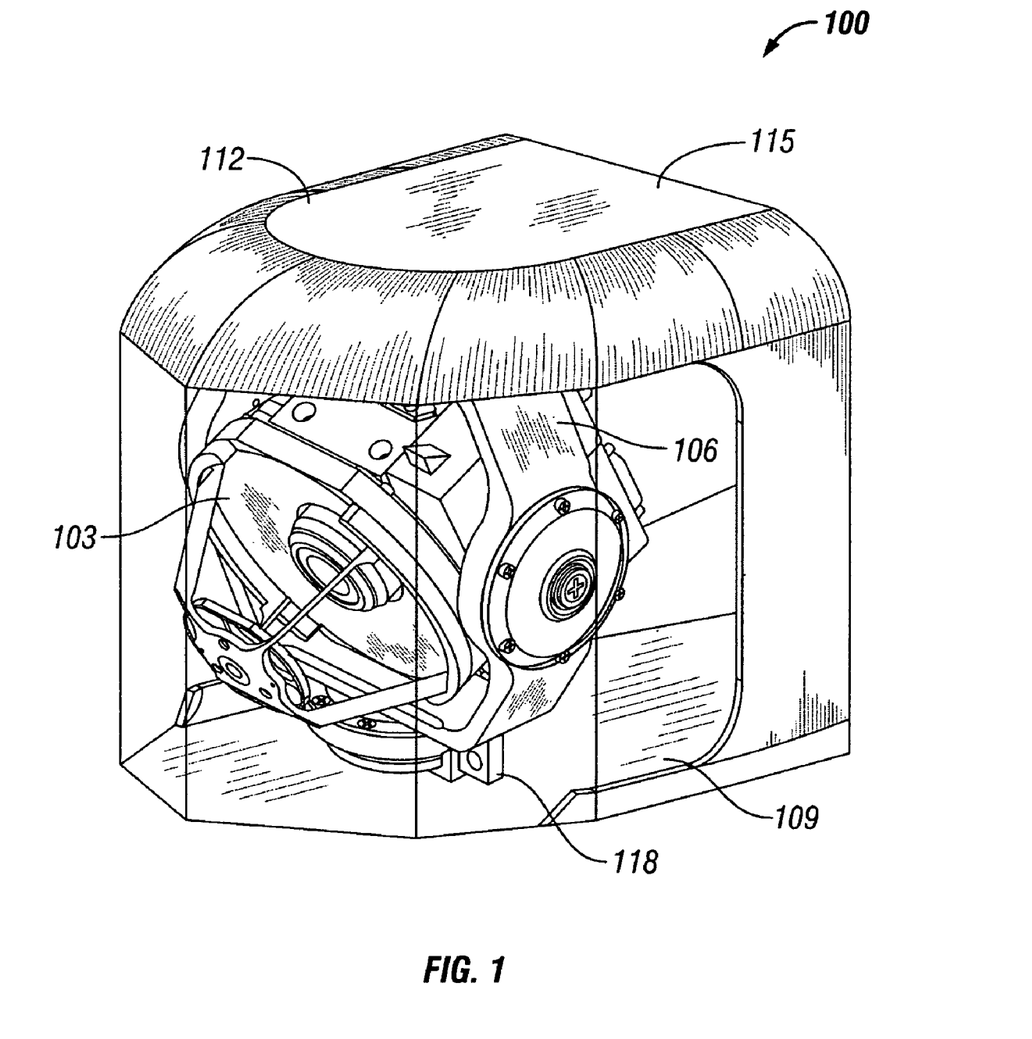
FIG. 1 illustrates a laser-based system in one particular embodiment constructed and operated in accordance with the present invention in an assembled view.
Figure 2:
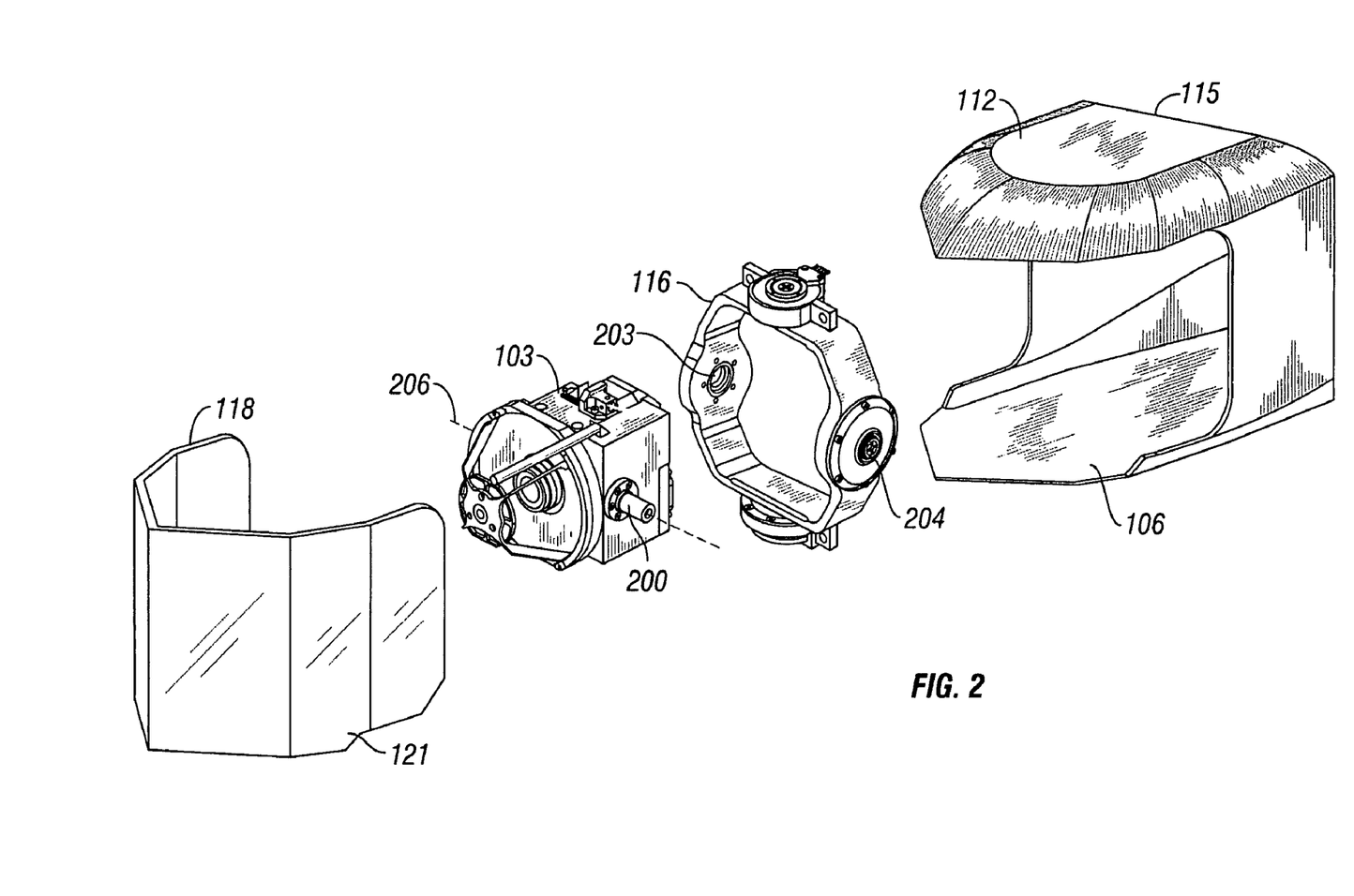
FIG. 2 illustrates the laser-based system of FIG. 1 in an exploded view.

FIG. 1 and FIG. 2 illustrate a laser based system 100 in one particular embodiment constructed and operated in accordance with the present invention in assembled and exploded views, respectively. In general, the laser based system 100 includes a sensor 103 mounted in a gimbal ring 106. The assembled sensor 103 and gimbal ring 106 are housed in a chamber 109, as shown in FIG. 1, defined by a forward end 112 of a platform 115. In the illustrated embodiment, the platform 115 is an aerial vehicle, and more particularly a missile or an airborne guided submunition, but this is not necessary to the practice of the invention.

The platform 115 includes a faceted window 118 that closes the chamber 109, as will be discussed further below. The faceted window 118 provides a wide Field of Regard ("FOR"). It also protects the sensor 103 and gimbal ring 106 from environmental conditions and, in this particular embodiment, aerodynamic forces. The faceted window 118 also contributes to the aerodynamic performance of the platform 115 as a whole, as will be recognized by those skilled in the art having the benefit of this disclosure. Note that the fuselage of the forward end 112 is shaped to match the faceting of the window 118. This also is not necessary to the practice of the invention, but enhances the aerodynamic performance of the platform 115 in this particular embodiment.

Still referring to FIG. 1-FIG. 2, the flat window segments 121 (six of which are shown in FIG. 2, but only one of which is indicated) of the faceted window 118 provide a wide FOR. The window segments 121 are fabricated from a material that transmits the LADAR signal but can also withstand applicable environmental conditions. In the illustrated embodiment, one important environmental condition is aerodynamic heating due to the velocity of the platform 115. Another important environmental condition for the illustrated embodiment is abrasion, such as that caused by dust or sand impacting the window 118 at a high velocity. Thus, for the illustrated embodiment, BK-7 glass is a highly desirable material, but alternative embodiments may employ fused silica. ZnSe, $Al_2O_3$, Ge, and Pyrex.

Using the flat window segments 121 rather than a spherical dome (not shown) also reduces the cost of the window 118, allows wide azimuth angles, and allows more freedom in the placement of the gimbal trunions 200. There is no significant degradation on image quality provided the window facets 121 do not have any wedge angle between their surfaces. However, the faceted window 118 increases the overall length of the front end 112, has more aerodynamic drag and flow asymmetry, and requires seams. It also has the potential for reflection losses if the output beam meets any window surface at near grazing incidence.

Note, however, that the faceted window 118 is not necessary to the practice of the invention in all embodiments. Alternative embodiments may instead employ, for instance, a single conventional, spherical hypersphere (not shown) or spherical segments (also not shown) if the aerodynamic requirements for a given application are sufficiently important. Alternatively, one compromise uses a spherical segment in front and one or two others out at right angles to the missile axis. If tone one side is domed, loitering must be down in the direction that places that segment towards the ground. Thus, the window 118 may also be spherical or spherically segmented in alternative embodiments.

Figure 3:
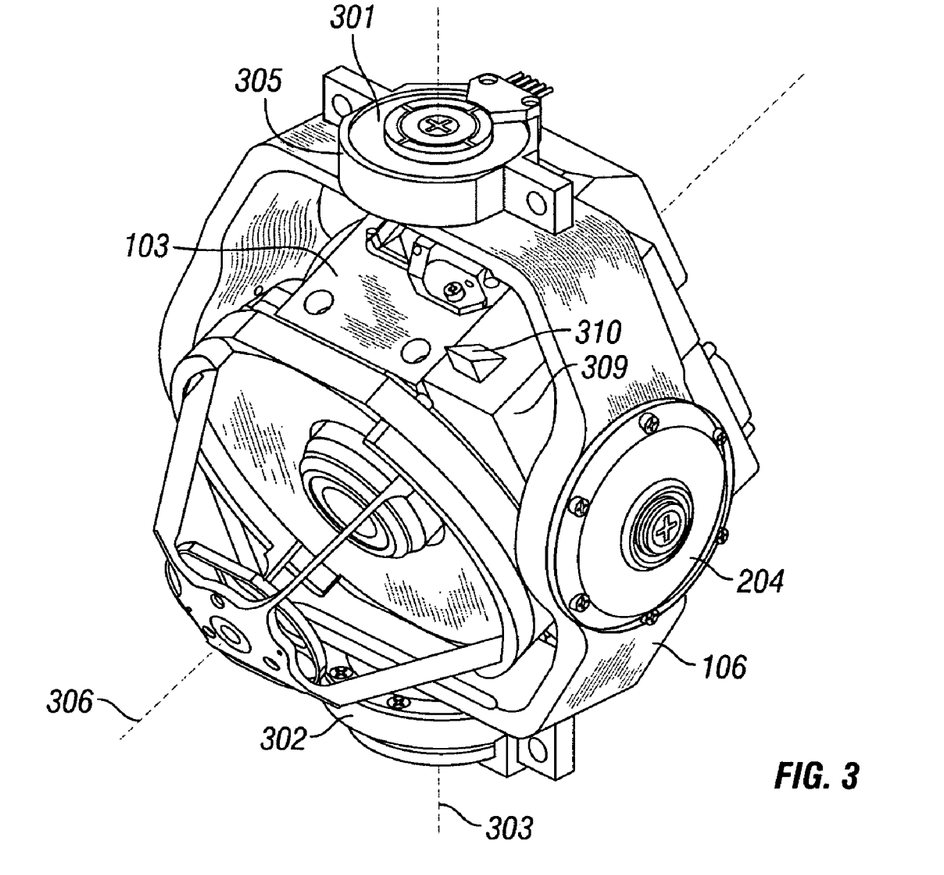
FIG. 3 shows the laser-based sensor of FIG. 1-FIG. 2 in greater detail.

FIG. 3 illustrates the gimbaled sensor 103 in greater detail. The sensor 103 implements both a LADAR capability and a SAL capability. The LADAR side of the sensor 103 is a variation on the LADAR sensor disclosed and claimed in U.S. Pat. No. 5,224,109, entitled "Laser Radar Transceiver," on Apr. Jun. 29, 1993, to LTV Missiles and Electronics Group as assignee of the inventors Nicholas J. Krasutsky et al. ('the '109 patent). LADAR sensors similar to that in the '109 patent are also disclosed in:

(i) U.S. Pat. No. 5,200,606, entitled "Laser Radar Scanning System," on Apr. 6, 1993, to LTV Missiles and Electronics Group as assignee of the inventors Nicholas J. Krasutsky et al. ("the '606 patent); and (ii) U.S. Pat. No. 5,285,461, entitled "Improved Laser Radar Transceiver," on Feb. 8, 1994, to Loral Vought Systems Corporation as assignee of the inventors Nicholas J. Krasutsky et al.

These patents are now commonly assigned herewith. However, as will be described more fully below, the laser for the LADAR functionality of the sensor 103 has been moved off the gimbal and the optical train on the receive side has been adapted for use with the SAL capability.

Also, the SAL designator 309 has been added on-gimbal. Some embodiments may locate the lasers for both the LADAR side and the SAL side on-gimbal, but moving one off-gimbal simplifies the packaging. Off-gimbal laser configurations have been used in gimbaled system in the past but they generally used complicated mirror configurations to maintain alignment between the transmit and receive paths. See, e.g., the '109 patent and other patents cited above. However, recent developments in Large Mode Area ("LMA") optical fibers have allowed high peak powers to be transmitted while maintaining good beam optical quality. These fibers can emit directly as part of a fiber laser or amplifier, alternatively, they can be used to transmit the output from any laser up to the gimbaled platform.

FIG. 3 shows the sensor 103 mounted to the gimbal ring 106. As is best shown in FIG. 2, the sensor 103 includes a pair of trunions 200 (only one shown) that are rotatably mounted within a pair of bores 203 (only one shown) in the gimbal ring 106. The bores 203 include mechanical assemblies such as bearings, bushing, etc. (not shown) to facilitate rotation of the trunions 200 in the bores 203 in a manner known to the art. The LADAR sensor 103 is a variant of the sensor described in the '109 patent referenced above and employs an optical train similar to that described above relative to FIG. 3. A servo-drive motor 204 drives the sensor 103 through the trunions 200 to scan the sensor in elevation. In the illustrated embodiment, the sensor 103 is scanned in elevation approximately ±30° relative to the axis 206 defined by the trunions 200 and shown in FIG. 2 in broken lines. However, the amount of elevational scan is implementation specific and may differ in alternative embodiments.

Returning to FIG. 3, the sensor 103 is mounted through the gimbal ring 106 from the top 301 and bottom 302 so that extended travel and scanning in azimuth is possible. Note that "top" and "bottom" are defined relative to the nominal orientation of the platform 115 relative to the Earth's field of gravity or the ground surface. As the platform 115 changes this orientation, so, too, will the orientation of the "top" 301 and "bottom" 302 relative to these references. The sensor 103 is mounted through the gimbal ring 106 using a trunion/bore approach and bearing/bushing approach similar to that described immediately above and as is conventional in the art. The sensor 103 and gimbal ring 106 are driven in azimuth by servo-motors 305 about an axis 303 shown in FIG. 3 in broken lines. The sensor 103 is driven in elevation by the servo motor 204 about an axis 206 shown in FIG. 2 in broken lines.

The position of the gimbal in elevation and azimuth is measured by position sensing devices located on the opposite sides of the gimbal ring across from each of the servomotors 204 and 305. The azimuthal position sensor 301 is shown in FIG. 3 along with the corresponding azimuthal gimbal servo-motor 305. Position can be sensed by a number of devices including potentiometers, electrical encoders and optical encoders, or other techniques known to the art, with the preferred method being optical encoders.

In the illustrated embodiment, the gimbaled sensor 103 is capable of scanning in azimuth substantially past 180°. In the illustrated embodiment, the goal is a full 210° scan and the term "substantially" is a recognition that sometimes manufacturing variances or tolerances or sometimes operational conditions impair achievement of a full 210° azimuthal scan. The illustrated embodiment achieves the 210° scan by scanning ±105° from the boresight 306, or longitudinal axis of the platform 115, shown in broken lines in FIG. 3. Note, however, that alternative embodiments might employ alternative gimbaling techniques and any suitable gimbaling technique known to the art may be employed.

Figure 4:
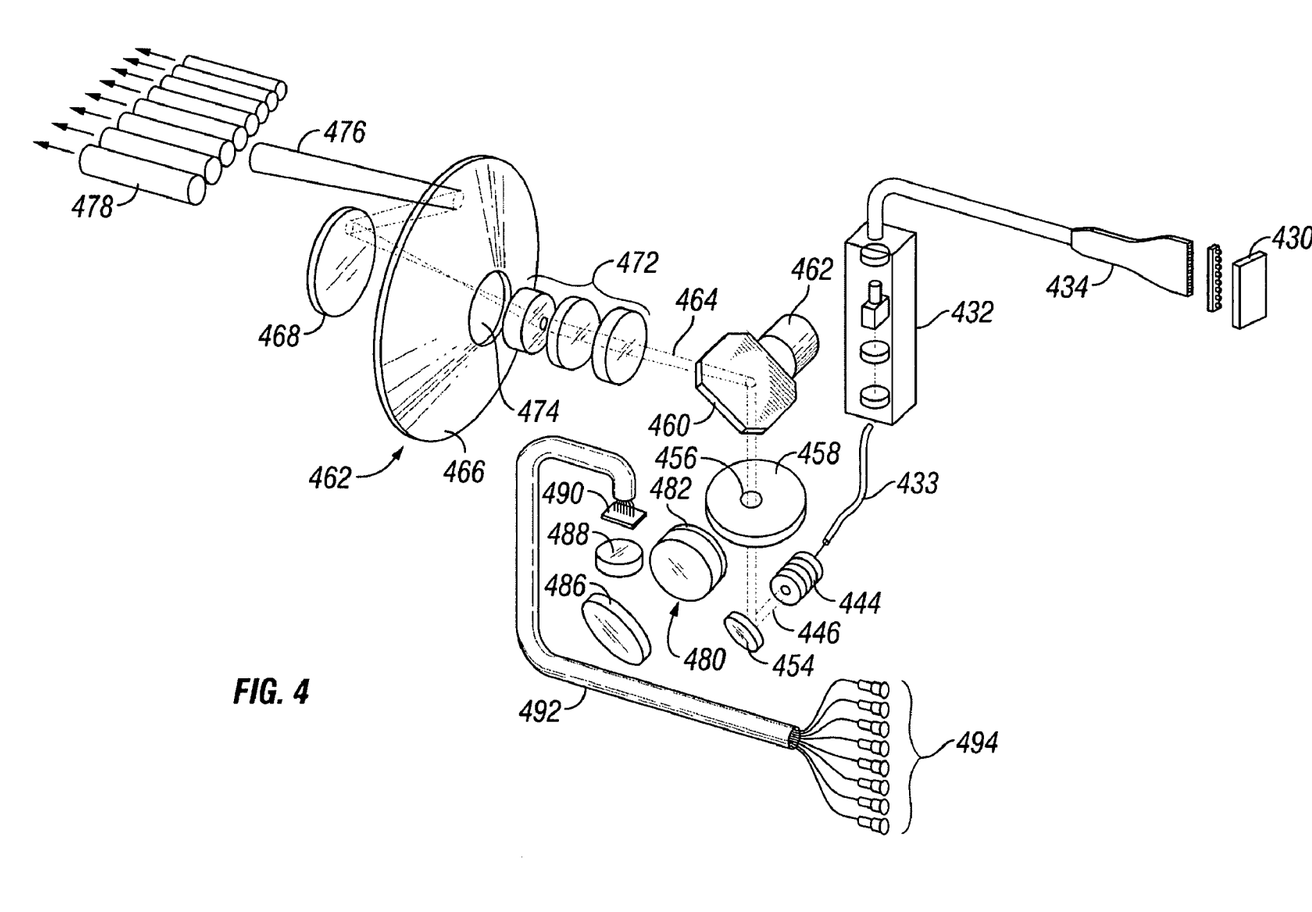
FIG. 4 is an exploded view of several components of an optical train of one particular embodiment of the sensor in the LADAR system of FIG. 1-FIG. 2.

Turning now to FIG. 4A, selected portions of the optics 400 in one particular embodiment of the sensor 103 are shown in an exploded view. A gallium aluminum arsenide ("GaAlAs") laser 430 pumps a solid state laser 432. The solid state laser 432 emits the laser light energy employed for illuminating the target. The GaAlAs pumping laser 430 produces a continuous signal of wavelengths suitable for pumping the solid state laser 432, e.g., in the crystal absorption bandwidth. Pumping laser 430 has an output power, suitably in the 10-20 watt range, sufficient to actuate the solid state laser 432.

The pumping laser 430 and the solid state laser 432 are fixedly mounted on the housing of the forward end 112. The output of the solid state laser 432 is transported to the gimbal by means of a high power optical fiber 433. Since the solid state laser 432 is fiber-coupled to the gimbal, many laser types can be used, e.g., side pumped lasers and fiber lasers, provided they can be coupled into the fiber. In the case of fiber lasers it is also possible to use the lasing fiber directly to connect to the sensor head. Thus, alternative embodiments may use lasers other than solid state lasers. Output signals from the high power optical fiber 433 are transmitted through a beam input lens 431 and a fiber optic bundle 434. The fiber optic bundle 434 has sufficient flexibility to permit scanning movement of the laser based system 100 during operation as described below.

Still referring to FIG. 4, the solid state laser 432 is suitably a Neodymium ("Nd") doped yttrium aluminum garnet ("YAG"), a yttrium lithium fluoride ("YLF"), or a Nd:YVO$_4$ laser. The solid state laser 432 is operable to produce, in this particular embodiment, pulses with widths of 10 to 20 nanoseconds, peak power levels of approximately 10 kilowatts, at repetition rates of 10-120 kHz. The equivalent average power is in the range of 1 to 4 watts. The preferred range of wavelengths of the output radiation is in the near infrared range, e.g., 1.047 or 1.064 microns.

The output generated by solid state laser 432, in the present embodiment, is carried to the gimbaled head by the high power fiber 433, as mentioned above. The high power fiber 433 has sufficient flexibility to permit scanning movement of the laser based system 100 during operation as described below. The output end of the high power fiber 433 is mounted on the gibaled head so that the laser beam emerging from it passes through the beam expander 440. The beam expander 440 comprises a series of (negative and positive) lenses which are adapted to expand the diameter of the beam to provide an expanded beam 442, suitably by an 8:1 ratio, while decreasing the divergence of the beam.

The expanded beam 442 is next passed through a beam segmenter 444 for dividing the beam into a plurality of beam segments 446 arrayed on a common plane, initially overlapping, and diverging in a fan shaped array. The divergence of the segmented beams 446 is not so great as to produce separation of the beams within the laser based system 100, but preferably is sufficiently great to provide a small degree of separation at the target, as the fan-shaped beam array is scanned back and forth over the target (as will be described below with reference to output beam segments 448). Beam segmentation can be accomplished by using a series of calcite wedges, a holographic diffraction grating or a phased diffraction grating. The preferred method is using a phased diffraction grating because of its predictable performance and power handling capability.

As shown in FIG. 4, the resultant segmented beams 446 are then reflected from a third turning mirror 454, passed through an aperture 456 of an apertured mirror 458, and subsequently reflected from a scanning mirror 460 in a forward direction relative to the platform 115. The aperture 456 is located off the center of the aperture mirror 458. The scanning mirror 460 is pivotally driven by a scanning drive motor 462, which is operable to cyclically scan the beam segments 446 for scanning the target area. In a preferred embodiment, the beam segments 446 are preferably scanned at a rate of approximately 100 Hz. The turning axis of the scanning drive motor 462 is aligned in parallel with the segmenter 444 axis whereby the resultant beam array 446 is scanned perpendicularly to the plane in which the beams are aligned.

An afocal, Cassegrainian telescope 462 is provided for further expanding an emitted beam 464 and reducing its divergence. The telescope 462 includes a forward-facing primary mirror 466 and a rear-facing secondary mirror 468. A lens structure 472 is mounted in coaxial alignment between the primary mirror 466 and the scanning mirror 460, and an aperture 474 is formed centrally through the primary mirror in alignment with the lens structure.

The transmitted beams which are reflected from the scanning mirror are directed through the lens structure 472 for beam shaping, subsequently directed through the aperture 474 formed centrally through the primary mirror, and subsequently reflected from the secondary mirror 468 spaced forwardly of the primary mirror and is then reflected from the front surface of the primary mirror 466. The resultant transmitted beam 476, is a fan shaped array which is scanned about an axis parallel to its plane. The beam array 478 illustrates the diverged spacing of the beam segments as they reach the target, wherein the beams are in side-by-side orientation, mutually spaced by a center-to-center distance of twice their diameters.

The telescope 462 receives laser energy reflected from a target that has been illuminated by the array of transmitted beams. This received energy is then reflected successively through the primary mirror 466 and the secondary mirror 468, the lens assembly 472, and the scanning mirror 460, toward the apertured mirror 458. Because the reflected beam is of substantially larger cross-sectional area than the transmitted beam, it is incident upon the entire reflecting surface of the apertured mirror 458, and substantially all of its energy is thus reflected laterally by the apertured mirror 458 toward collection optics 480.

The collection optics 480 includes a narrow band filter 482, for filtering out wavelengths of light above and below a desired laser wavelength to reduce background interference from ambient light. The beam then passes through condensing optics 484 to focus the beam. The beam next strikes a fourth turning mirror 86 toward a focusing lens structure 488 adopted to focus the beam upon the receiving ends 490 of a light collection fiber optic bundle 492. The opposite ends of each optical fiber 492 are connected to illuminate a set of diodes 494 in a detector array, whereby the laser light signals are converted to electrical signals which are conducted to a processing and control circuit (not shown).

The fiber optic bundle 492 preferably includes nine fibers 493 (only one indicated), eight of which are used for respectively receiving laser light corresponding to respective transmitted beam segments and one of which views scattered light from the transmitted pulse to provide a timing start pulse. Accordingly, the input ends 490 of the fibers 492 are mounted in linear alignment along an axis which is perpendicular to the optical axis. The respective voltage outputs of the detectors 494 thus correspond to the intensity of the laser radiation reflected from mutually parallel linear segments of the target area which is parallel to the direction of scan.

However, this is not necessary to the practice of the invention in all embodiments. One intended purpose of the present invention is application in a lookdown and loitering mode, as is discussed further below relative to FIG. 6A-FIG. 6C. Thus, all that is required is that the gimbaled receiver 103 be able to scan sufficiently far in azimuth to one side of the platform 115 so as to enable this functionality. An embodiment capable of scanning a full 210° by scanning ±105° off boresight is more versatile. However, this functionality can be achieved by scanning off to only one side 90° off boresight. In general, any given embodiment should be able to scan at least 90° off boresight to at least one side of the platform 115.

Referring again to FIG. 4, in the illustrated embodiment, the LADAR transmitter has been moved off the gimbal and its output is coupled to the sensor head 103 by means of an optical fiber 433. This simplifies the packaging of the sensor 103. Off-gimbal laser configurations have been used in gimbaled systems in the past but they generally used complicated mirror configurations to maintain alignment between the transmit and receive paths. Recent developments in Large Mode Area ("LMA") optical fibers have allowed high peak powers to be transmitted while maintaining good beam optical quality. These fibers can emit directly as part of a fiber laser or amplifier, alternatively, they can be used to transmit the output from any laser up to the gimbaled platform.

The laser based system 100 will also include electronic circuitry (not shown) for generating the scan signals that drive the servo-motors, laser, detectors, and scanning drive motor and to capture the information in the detected signals. Scan signal generation can be performed by first using the scanning drive motor 462 to drive the scan mirror 360 in elevation. This produces multiple rows of pulses as shown in FIG. 6B. Scanning the entire sensor in azimuth using the servo motor 305, shown in FIG. 3, then produces a scan of the target area. Suitable information capture and processing techniques are disclosed in:

(i) U.S. Pat. No. 6,115,113, entitled "Method for Increasing Single-Pulse Range Resolution," on Sep. 5, 2000, to Lockheed Martin Corporation as assignee of the inventor Stuart W. Flockencier;

(ii) U.S. Pat. No. 5,243,553, entitled "Gate Array Pulse Capture Device," on Sep. 7, 1993, to Loral Vought Systems Corporation as assignee of the inventor Stuart W. Flockencier.

Both of these patents are commonly assigned herewith. Note, however, that any suitable technique known to the art may be employed.

The electronic circuitry and detection electronics are fixedly mounted relative to the housing or other suitable supporting structure aboard the platform 115. The scanning and azimuth translations of the laser based system 100 therefore do not affect corresponding movement of the detection system. Accordingly, the mass of the components which are translated during scanning is substantially lower than would be the case if all components were gimbal-mounted. These benefits are amplified in the case of the embodiment shown in FIG. 3 since the laser is also off-gimbal.

Since the laser based system 100 is capable of looking out at over ±90° to both sides of the platform 115, it can be used over a wide swath as the platform 115 moves through its environment. Consider FIG. 6A, which shows the potential for target examination out to the range 600 of the laser based system 100 on both sides of the flight path 603, shown in broken lines. The surveillance area 606 includes the area 609 that has already been reconnoitered and the area 612 currently under surveillance. The area 612 currently under surveillance is determined by the position of the platform 115, the range 600 of the laser based system 100, and the extent of the azimuthal scan of the laser based system 100.

The operation of the gimbaled LADAR sensor 100 in scanning is conceptually illustrated in FIG. 6B. The gimbaled LADAR sensor 100 transmits the LADAR signal 605 to scan the area 612. Each scan is generated by scanning elevationally, or vertically, several times while scanning azimuthally, or horizontally, once within the FOR. FIG. 6B illustrates a single elevational scan 607 during the azimuthal scan 608. Thus, each scan is defined by a plurality of elevational scans such as the elevational scan 607 and the azimuthal scan 608. The velocity, depression angle of the sensor 103 with respect to the horizon, and total azimuth scan angle of the LADAR platform 115 determine the extent of the scan.

The LADAR signal 605 is typically a pulsed signal and may be either a single beam or a split beam. Because of many inherent performance advantages, split beam laser signals are typically employed by most LADAR systems. A single beam may be split into several beamlets spaced apart from one another by an amount determined by the optics package (not shown) aboard the platform 115 transmitting the LADAR signal 605. Each pulse of the single beam is split, and so the LADAR signal 605 transmitted during the elevational scan 607 in FIG. 6B is actually, in the illustrated embodiment, a series 611 of grouped beamlets 613 (only one indicated). The gimbaled LADAR sensor 103 transmits the LADAR signal 605 while scanning elevationally 607 and azimuthally 608. The LADAR signal 605 is continuously reflected back to the platform 115, where it is detected and captured.

The characteristics of the LADAR signal 605 will be a function of the LADAR sensor 103, which will, in turn, be a function of the mission in a manner known to the art. The LADAR sensor 300, shown in FIG. 3A-FIG. 3B, splits a single 0.2 mRad l/e$^2$ laser pulse into septets with a laser beam divergence for each spot of 0.2 mRad with beam separations of 0.4 mRad. The optics package includes fiber optical array (not shown) having a row of seven fibers spaced apart to collect the return light. The fibers have an acceptance angle of 0.3 mRad and a spacing between fibers that matches the 0.4 mRad far field beam separation. An elevation scanner (not shown) spreads the septets vertically by 0.4 mRad as it produces the vertical scan angle. The optical transceiver including the scanner is then scanned azimuthally to create a full scan raster.

Assume the laser based system 100 identifies the target 610 as an object of interest, and wishes to continue observing the object. As is shown in FIG. 6C, the platform 115 flies a circular loiter pattern 617 over the target area 615, including the current surveillance area 612. In the illustrated embodiment, the loiter pattern 617 is in a clockwise direction, but could alternatively be counterclockwise. The laser based system 100 can then look out to the side and examine a portion 618, the constant track and surveillance area, of the area 612 being circled. If the platform 115 flew level, the loitering radius for the loiter pattern 617 would need to be large enough to allow the laser based system 100 look down to see the ground at the maximum gimbal lookdown angle. If, however, bank-to-turn guidance is used, the platform 115 will bank into the turn, providing the sensor with additional lookdown capability.

The bank angle θ of the platform 115, shown in FIG. 6C, is a function of the turn radius and the velocity of the platform 115. For highly maneuverable platforms, the bank angle Θ can exceed 60°. The banking of the platform 115 rotates the laser based system 100 and provides additional down-look capability for the seeker relative to the ground. Depending on the bank angle θ, the laser based system 100 could look straight down or even past vertical. This is evident from the indicated coverage cone 621 in FIG. 6C.

More particularly, FIG. 6C shows two areas 612, 618 on the ground below the flight path 603. The area 618 shows the portion of the ground which is always visible to the laser based system 100, regardless of the position of the platform 115 along its flight path 603. The area 612 is the additional area which can be seen by the laser based system 100, depending on the position of the platform 115 along its flight path 603. The circle 621 drawn on the ground below the loiter pattern 617 of the flight path 603 shows the line where the laser based system 100 is looking straight down. If the radius of the loiter pattern 617 is comparable to or smaller than the altitude 624 of the platform 115 much of the area 618 is viewed at steep angles to the ground. This facilitates use in urban or forested target areas where terrain masking is a problem for sensors working at shallow depression angles.

In the illustrated embodiment, the altitude 624 is approximately 300 m, the diameter of the loiter pattern 617 is approximately 2 km, the diameter of the area 618 is 1.2 km, and the track window of the target 609 is 200 m×200 m. Note, however, that these dimensions are implementation specific, and that other embodiments might operate with different dimensions. Thus, these dimensions are not material to the practice of the invention.

Figure 5A:
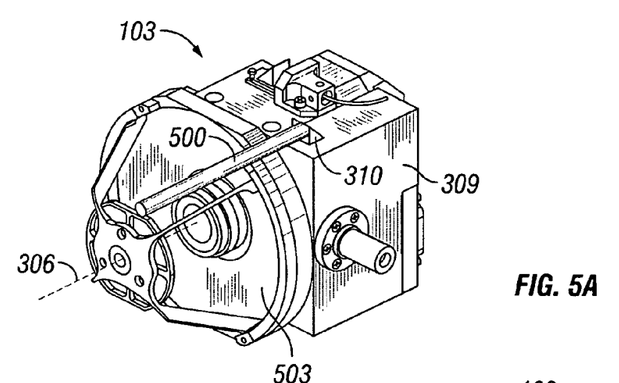
FIG. 5A-FIG. 5C illustrates the on-gimbal laser designator of the laser-based system of FIG. 1-FIG. 2, first shown in FIG. 4, from different perspectives.
Figure 5B:
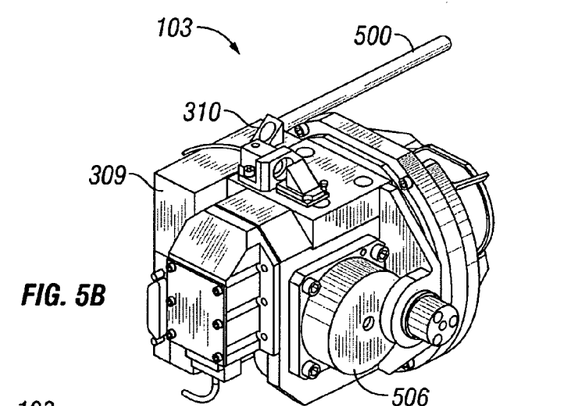
Figure 5C:
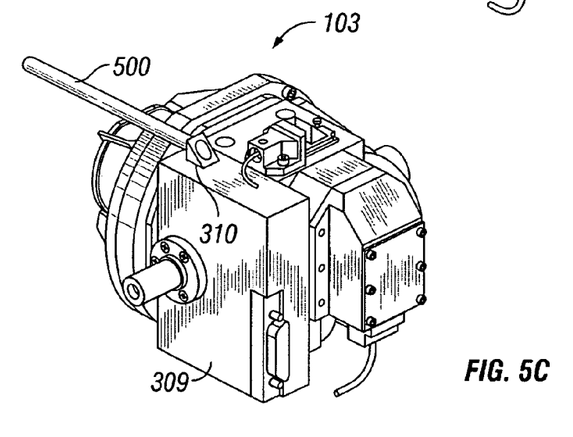

Returning now to FIG. 3, the illustrated embodiment also includes an on-gimbal laser designator 309 that provides a laser designator mode of operation. The laser designator 309 and associated turning prism 310 are better illustrated in FIG. 5A-FIG. 5C. More particularly, the laser designator 309 produces a pulsed laser beam 500 that may be used for target designation. FIG. 5A-FIG. 5C illustrate the emission of the pulsed beam 500 from the laser designator 309 through the turning prism 310 within the chamber 109 and behind the window 118. Note that it is possible to use the LADAR transmitter for designation but, since the power and beam characteristics normally required for designation are different from those required for LADAR operation, the laser design will be an undesirable compromise between the two requirements. The designator optics can be strap-down, as in the illustrated embodiment, or equipped with scanning mechanisms (not shown).

Figure 7A:
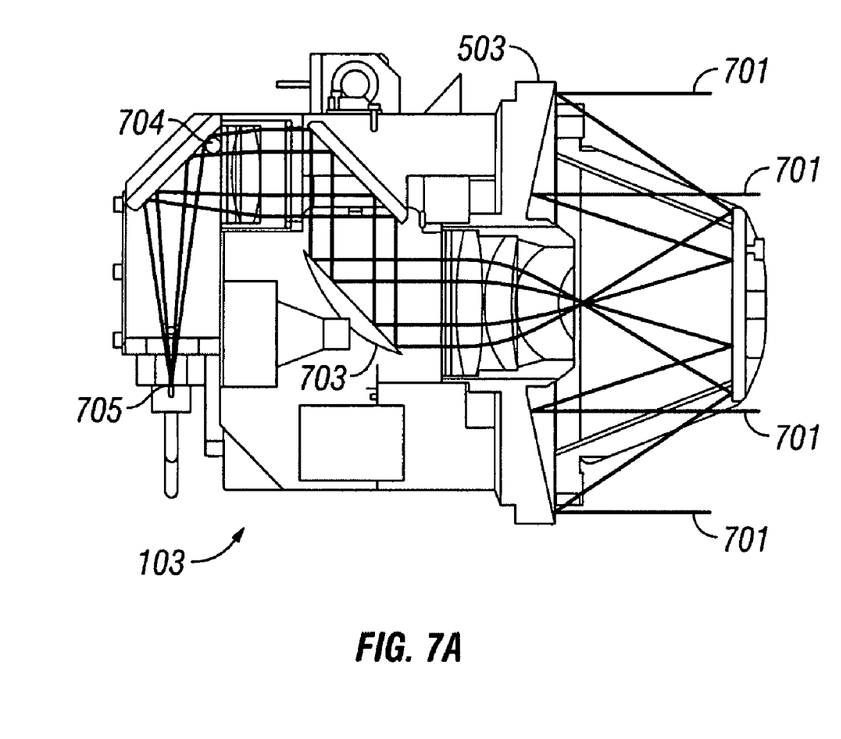
FIG. 7A-FIG. 7B illustrate in a cross section and a plan view, respectively, the sensor of FIG. 1 with a scan mirror in the LADAR position for LADAR operations.
Figure 7B:
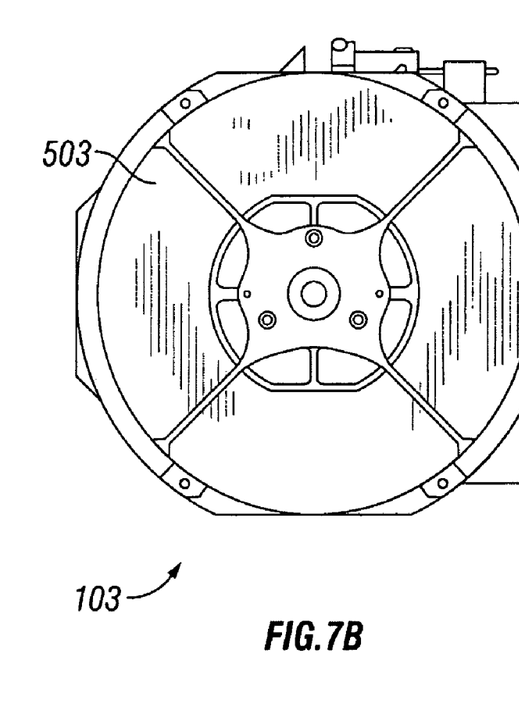

More particularly, the laser designator 309 is located on the sensor 103 and generates a laser beam 500. The laser beam 500 is directed off the sensor 103 by the turning prism 310 in a direction parallel to the optical axis 306 of the telescope 503. Referring now to FIG. 7A and FIG. 7B, the sensor 103 includes a scan mirror 703 that may be moved between two positions, one for use in LADAR operation and one for use in SAL, or designation, operations. The scanning mirror 703 is shown in the LADAR position in FIG. 7A. The scanning mirror 703 is mounted to and moved by elevation scanner motor 806, shown in FIG. 8B.

Figure 6A:
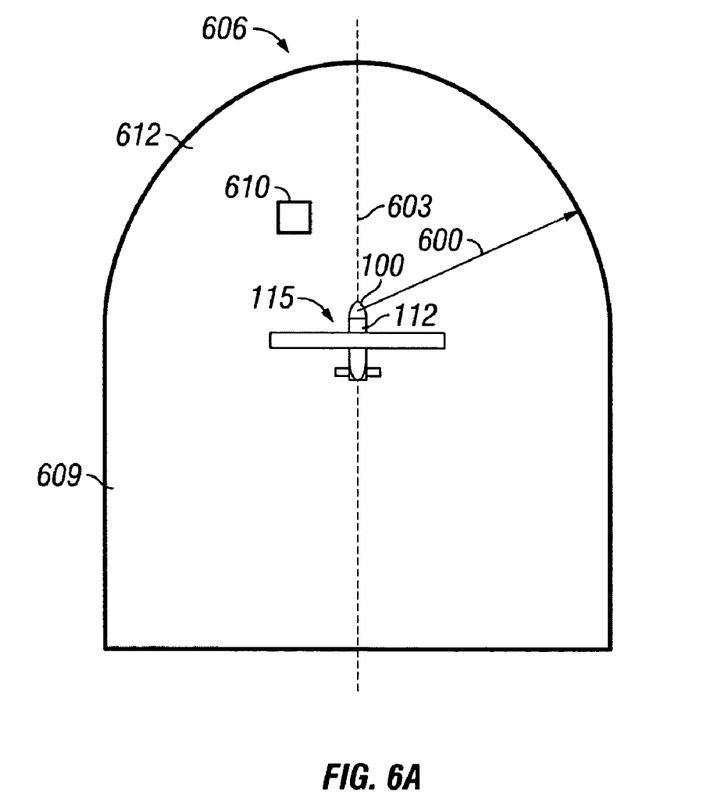
FIG. 6A-FIG. 6C depict the LADAR system of FIG. 1-FIG. 2 in operation in a lookdown and loitering scenario.
Figure 6B:
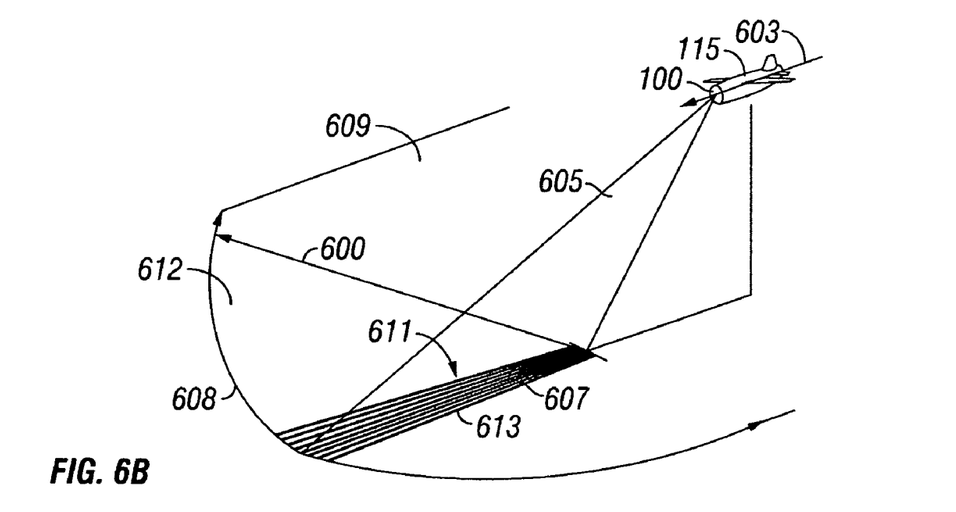
Figure 6C:
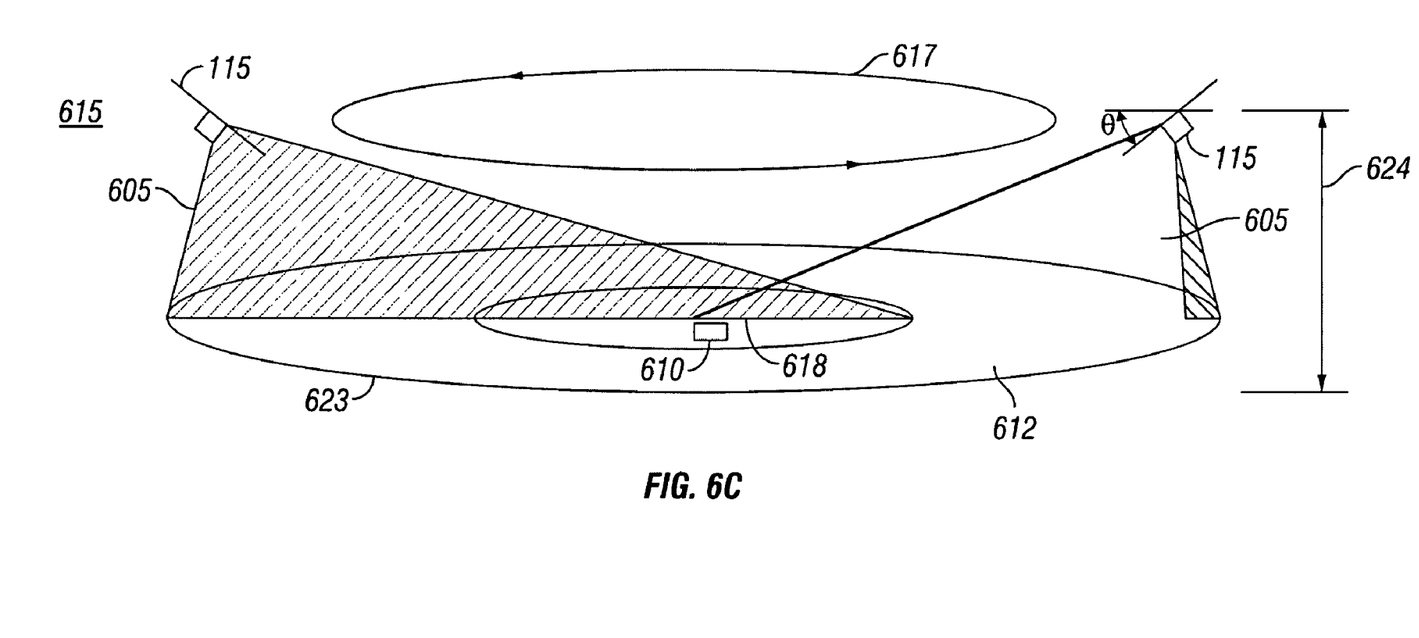

When the sensor 103 is being used in the LADAR mode, light from the LADAR laser is directed into the far field and falls on the target area as discussed relative to FIG. 6A-FIG. 6C. Scattered light 701 from the target area is collected by the telescope 503 which directs it onto the elevation scan mirror 703. The scattered light 701 is then directed upward through the optical train 704 by the elevation scan mirror 703, and is focused onto the LADAR detector fiber array 705. The high speed scanner rotates the elevation scan mirror 703 through a small angle center around 45°. This provides the fiber array 705 with a view of the target scene at different elevations. The external gimbal 106 is used to provide stabilization and to scan the sensor 103 in azimuth so the entire target area can be examined by the LADAR and a three dimensional scene image can be formed.

Figure 8A:
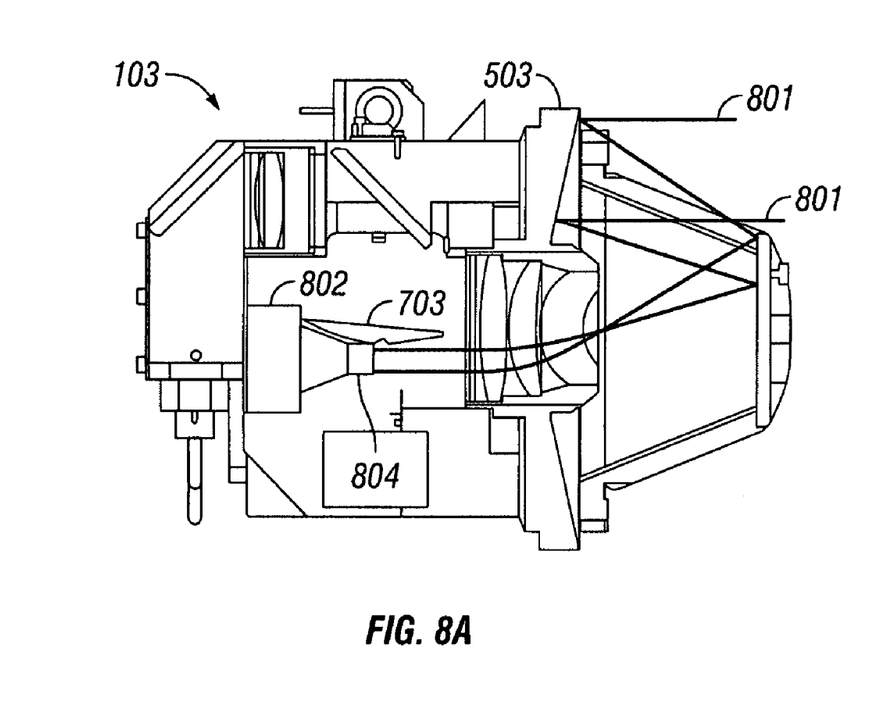
FIG. 8A-FIG. 8B illustrate in a cross section and a plan view, respectively, the sensor of FIG. 1 with the scan mirror in the SAL position for SAL operations.
Figure 8B:
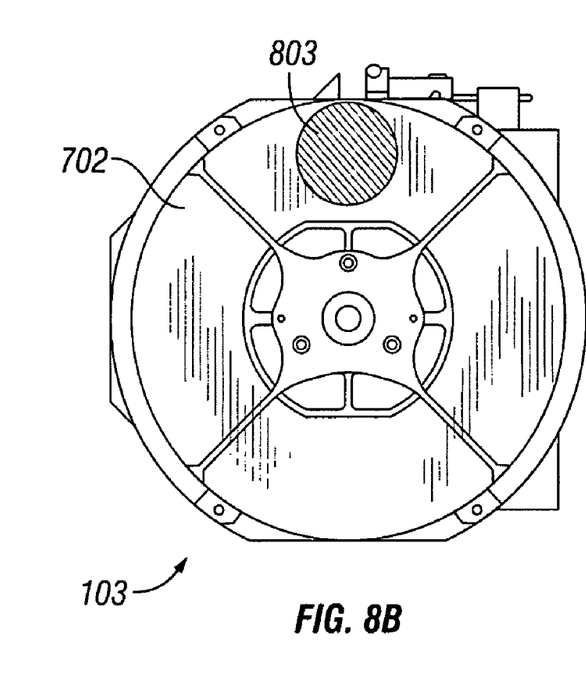

FIG. 8A and FIG. 8B show the sensor 103 when it is being used in the SAL mode. Moving from the LADAR mode to the SAL mode is accomplished by flipping the elevation scan mirror 703 of the telescope optical path. The final position of the scanning mirror 703, as shown in FIG. 8A and FIG. 8B, is not critical as long as it is out of the way of the SAL detector optical aperture 804 so that the SAL detector 802 has a clear view through the telescope 503. It is assumed that the target is being designated by a source external to the platform 115 in this particular embodiment. Scattered light 701 coming from the target falls on the telescope 503. The SAL detector 802 does not utilize all of the light falling on the telescope 503, but rather, only light 801 which falls on the shaded area 803 shown in FIG. 8A.

The SAL detector input aperture 804 is placed at the exit pupil of the telescope 503 and the shaded area 803 represents the portion if the telescope 503 input aperture subtended by the SAL detector aperture 804 at the entrance to the telescope 503.

Since SAL mode detector and optics are located at the exit pupil of the sensor telescope 503, the SAL optics have access to the entire angular field of regard of the telescope 503 but utilize only a specific, unmasked portion 803 of the telescope 503 input aperture for light collection. This allows the SAL mode to use the optical magnification of the telescope 503 while having an optical path which is unobstructed by the telescope 503 secondary supports 709. The tradeoff is that only a portion of the entire telescope 503 aperture is used by the SAL detector. This limits the effective range of that mode but it preserves linearity and limits noise induced by the telescope 503 supports 709. The SAL sensor range should still be adequate for most missile applications, especially where lock-on before launch capability is not required. The small SAL mode optics make packaging easier and lower system cost. Both of these benefits are significant in small missile applications.

The scanning mirrors currently used in most LADARs are driven by placing them on a motor shaft. The motor controller then moves the mirror through the desired pattern needed for LADAR operation. These are usually high torque motors and moving them through large angles can be difficult because it involves moving across different motor windings where the available torque is limited. While the mirror 703 is being flipped from the LADAR position to the SAL position and back, neither mode is operational so the mirror can be driven open loop through the low torque region using the rotor and mirror inertia. Alternatively, a small set of secondary windings can be used to aid in the transition. Scanning mirrors can be controlled in a number of ways the specific method is not important, only the fact that it is used as part of the optical train in the LADAR mode and is moved out of the way for the SAL mode.

Moving back to the LADAR mode is accomplished in a similar fashion by flipping the scanning mirror 703 back to the position shown in FIG. 7A and FIG. 7B so that it can be used to direct the light into the LADAR detectors. Moving back and forth between the two modes can be done as often as the operational scenario requires, but the two modes cannot be used simultaneously.

The laser based system 100 can be used to locate and track the targets, e.g. the target 610 in FIG. 6A, and the coordinate information passed to the laser designator 309 in a number of ways. For instance, coordinate information may be passed as the coordinates of the target 610, derived from Global Positioning System ("GPS") coordinates platform 115 or as a targeting direction using an inertial measurement unit ("IMU") aboard the platform 115. In the illustrated embodiment, the LADAR sensor 103 and the designator 609 are aligned to allow pointing and targeting information to be shared directly between the two. Thus, the laser based system 100 can be operated in LADAR mode as illustrated in FIG. 6A to locate the target 610. The laser based system 100 will yield three-dimensional data describing the location of the target 610, which can then be passed to the control of the laser designator 309. This information can then be used to designate the target 610.

If the laser designator 309 and sensor 103 wavelengths are different, both can be operated simultaneously. If the laser designator 309 and sensor 103 are at the same wavelength, then the laser designator 309 might interfere with the LADAR operation of the sensor 103 when it is actively pulsing. This can be easily addressed because the duty cycle of the laser designator 309 is very low so the LADAR detectors (not shown) can be turned off during the designation pulse without significant loss in imaging capability.

The LADAR detectors can even be gated to pick up the return from the designation beam 500 so that the position of the designation beam 500 relative to the LADAR target image can be determined. This is an accurate way to maintain alignment between the two modes if the laser designator 309 has its own on-board steering mechanism. As the laser based system 100 loiters, the laser designator 309 can maintain a spot on the target 610 as long as the target 610 remains in area 618 of FIG. 6A. Illuminating the top of the target 610 would prevent masking of the designator spot as the platform 115 executes its flight pattern. Alternatively, a nearby spot could be designated and the relative coordinates passed on for further use.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:
   a gimbal capable of scanning in azimuth and in elevation; and
   a sensor mounted on the gimbal, including:
      a telescope defining an exit pupil through which the sensor collects reflected light;
      a LADAR optical path;
      a SAL optical path; and
      a mirror that directs light received through the telescope to the LADAR optical path in a first position and to the SAL optical path in a second position such that the SAL optical path receives the collected light from the exit pupil of the telescope.

2. The apparatus of claim 1, further comprising a laser designator mounted on-gimbal with the sensor.

3. The apparatus of claim 1, wherein the LADAR optical path may be used in laser designating.

4. The apparatus of claim 1, further comprising:
   an off-gimbal LADAR laser; and
   a large mode area fiber over which the beam generated by the LADAR laser is transmitted to the sensor.

5. The apparatus of claim 1, wherein collected light received by the SAL optical path receives collected light from a limited portion of the exit pupil.

6. An apparatus, comprising:
   a gimbal capable of scanning in azimuth and in elevation; and
   a sensor mounted on the gimbal, including:
      a telescope defining an exit pupil through which the sensor collects reflected light;
      a LADAR optical path;
      a SAL optical path; and
      means for directing light received through the telescope to the LADAR optical path in a first position and to the SAL optical path in a second position such that the SAL optical path receives the collected light from the exit pupil of the telescope.

7. The apparatus of claim 6, further comprising a laser designator mounted on-gimbal with the sensor.

8. The apparatus of claim 6, wherein the LADAR optical path may be used in laser designating.

9. The apparatus of claim 6, further comprising:
an off-gimbal LADAR laser; and
a large mode area fiber over which the beam generated by the LADAR laser is transmitted to the sensor.

10. The apparatus of claim 6, wherein collected light received by the SAL optical path receives collected light from a limited portion of the exit pupil.

11. The apparatus of claim 6, wherein the directing means comprises a mirror.

12. An apparatus, comprising:
a gimbal capable of scanning in azimuth and in elevation; and
a sensor mounted on the gimbal including a telescope defining an exit pupil through which the sensor collects reflected light, the sensor being capable of operating in a LADAR mode and in a SAL mode and receiving collected light in the SAL mode through a limited portion of the exit pupil.

13. The apparatus of claim 12, further comprising a laser designator mounted on-gimbal with the sensor.

14. The apparatus of claim 12, wherein the LADAR optical path may be used in laser designating.

15. The apparatus of claim 12, further comprising:
an off-gimbal LADAR laser; and
a large mode area fiber over which the beam generated by the LADAR laser is transmitted to the sensor.

16. The apparatus of claim 12, wherein the sensor further includes:
a LADAR optical path;
a SAL optical path; and
a mirror that directs light received through the telescope to the LADAR optical path in a first position and to the SAL optical path in a second position such that the SAL optical path receives the collected light from the exit pupil of the telescope.

17. The apparatus of claim 12, wherein the sensor further includes:
a LADAR optical path;
a SAL optical path; and
means for directing light received through the telescope to the LADAR optical path in a first position and to the SAL optical path in a second position such that the SAL optical path receives the collected light from the exit pupil of the telescope.

18. An apparatus, comprising:
a platform defining a chamber;
a window closing the chamber; and
a gimbaled sensor, including:
a telescope defining an exit pupil through which the sensor collects reflected light;
a LADAR optical path;
a SAL optical path; and
means for directing light received through the telescope to the LADAR optical path in a first position and to the SAL optical path in a second position such that the SAL optical path receives the collected light from the exit pupil of the telescope.

19. The apparatus of claim 18, further comprising a laser designator mounted on-gimbal with the sensor.

20. The apparatus of claim 18, wherein the LADAR optical path may be used in laser designating.

21. The apparatus of claim 18, further comprising:
an off-gimbal LADAR laser; and
a large mode area fiber over which the beam generated by the LADAR laser is transmitted to the sensor.

22. The apparatus of claim 18, wherein collected light received by the SAL optical path receives collected light from a limited portion of the exit pupil.

23. The apparatus of claim 18, wherein the directing means comprises a mirror.

24. The apparatus of claim 18, wherein the platform is a vehicle.

25. The apparatus of claim 18, wherein the window is segmented.

26. The apparatus of 25, wherein the segments comprise flat facets.

27. An apparatus, comprising:
a platform defining a chamber;
a window closing the chamber; and
a gimbaled sensor housed in the chamber and capable of operating in a LADAR mode and in a SAL mode, the gimbaled sensor receiving collected light in the SAL mode through a limited portion of an exit pupil of a telescope of the sensor.

28. The apparatus of claim 27, further comprising a laser designator mounted on-gimbal with the sensor.

29. The apparatus of claim 27, wherein the LADAR optical path may be used in laser designating.

30. The apparatus of claim 27, further comprising:
an off-gimbal LADAR laser; and
a large mode area fiber over which the beam generated by the LADAR laser is transmitted to the sensor.

31. The apparatus of claim 27, wherein the sensor further includes:
a LADAR optical path;
a SAL optical path; and
a mirror that directs light received through the telescope to the LADAR optical path in a first position and to the SAL optical path in a second position such that the SAL optical path receives the collected light from the exit pupil of the telescope.

32. The apparatus of claim 27, wherein the sensor further includes:
a LADAR optical path;
a SAL optical path; and
means for directing light received through the telescope to the LADAR optical path in a first position and to the SAL optical path in a second position such that the SAL optical path receives the collected light from the exit pupil of the telescope.

33. The apparatus of claim 27, wherein the platform is a vehicle.

34. The apparatus of claim 27, wherein the window is segmented.

35. The apparatus of 34, wherein the segments comprise flat facets.

36. The apparatus of claim 34, wherein the segments are hemispherical.

37. The apparatus of claim 27, wherein the window is shaped.

38. The apparatus of claim 27, wherein the window is hyperspherical.

39. A method, comprising:
operating a gimbaled sensor in a scanned LADAR mode, including receiving light through a telescope of the gimbaled sensor; and
operating the gimbaled sensor in a SAL mode, including receiving the collected light from the exit pupil of the telescope.

40. The method of claim 39, further comprising a laser designating a target with the gimbaled sensor.

41. The method of claim 40, wherein laser designating the target includes laser designating using the LADAR laser.

42. The method of claim 39, wherein receiving the collected light in the SAL mode includes receiving the collected light from a limited portion of the exit pupil of the telescope.

43. A method, comprising:
    operating a gimbaled sensor in a scanned LADAR mode, including receiving light through a telescope of the gimbaled sensor; and
    operating the gimbaled sensor in a SAL mode, including receiving the collected light from a limited portion of the exit pupil of the telescope.

44. The method of claim 43, further comprising a laser designating a target with the gimbaled sensor.

45. The method of claim 44, wherein laser designating the target includes laser designating using the LADAR laser.

* * * * *